United States Patent
Sawodny et al.

(10) Patent No.: US 11,668,077 B2
(45) Date of Patent: Jun. 6, 2023

(54) SYSTEM AND METHOD FOR DETERMINING THE MASS OF A PAYLOAD MOVED BY A WORKING DEVICE

(71) Applicant: Liebherr-France SAS, Colmar (FR)

(72) Inventors: Oliver Sawodny, Stuttgart (DE); Anton Renner, Stuttgart (DE); Hannes Wind, Stuttgart (DE)

(73) Assignee: Liebherr-France SAS, Colmar (FR)

( * ) Notice: Subject to any disclaimer, the term of this patent is extended or adjusted under 35 U.S.C. 154(b) by 737 days.

(21) Appl. No.: 16/662,286

(22) Filed: Oct. 24, 2019

(65) Prior Publication Data
US 2020/0157775 A1    May 21, 2020

(30) Foreign Application Priority Data

Oct. 26, 2018 (DE) ...................... 10 2018 126 809.2

(51) Int. Cl.
  *E02F 9/26* (2006.01)
  *E02F 1/00* (2006.01)
  (Continued)

(52) U.S. Cl.
  CPC ................ *E02F 9/265* (2013.01); *E02F 1/00* (2013.01); *E02F 9/2029* (2013.01);
  (Continued)

(58) Field of Classification Search
  None
  See application file for complete search history.

(56) References Cited

U.S. PATENT DOCUMENTS 7,627,410 B2 *  12/2009  Berry ................... E02F 9/2029
                                                              701/1
7,912,612 B2 *  3/2011  Janardhan ............. B25J 9/1638
                                                              37/413
(Continued)

FOREIGN PATENT DOCUMENTS

DE         101 38 973 A1      3/2002
DE      11 2008 003 239 T5   10/2010

OTHER PUBLICATIONS

Makkonen et al., "Automation of an excavator based on a 3D CAD model and GPS measurement," Proceedings of the 20th International Symposium on Automation and Robotics in Construction ISARC 2003—The Future Site, Sep. 25, 2004.

*Primary Examiner* — Jonathan M Dager
(74) *Attorney, Agent, or Firm* — Dilworth & Barrese, LLP

(57) ABSTRACT

The present invention relates to a system for determining the mass of a payload moved by a working device of a machine, comprising:
  a lifting-gear element that is movable along a path and is designed to move the working device;
  a sensor system that is designed to provide a plurality of machine-status signals which indicate a status of the machine;
  a force sensor system that is designed to provide a lifting-force signal that indicates a force on the lifting-gear element; and
  a control device that is designed:
  to use system parameters for load determination that originate from pre-configured CAD data, preferably CAD data that has been pre-configured at the factory, and/or from continuous calibration of system parameters;

(Continued)

to carry out calibration using the pre-configured parameters as initialisation if unsatisfactory results are achieved;

to carry out the calibration in an unloaded state, i.e. when the working device is empty, with automatically pre-defined stimulation trajectories being used for the machine or instructions being provided to the operator for stimulating the parameters;

to log the system statuses using the sensor and to carry out a system identification of this information; and to determine a mass of the payload on the basis of identified and/or pre-configured system parameters and system statuses, preferably on the basis of a position, a speed, an acceleration of the lifting-gear element and/or a force or torque on the lifting-gear element.

13 Claims, 3 Drawing Sheets

(51) Int. Cl.
  *E02F 9/20* (2006.01)
  *E02F 9/22* (2006.01)
  *G01G 23/01* (2006.01)
  *E02F 9/24* (2006.01)

(52) U.S. Cl.
  CPC .......... *E02F 9/2246* (2013.01); *G01G 23/01* (2013.01); *E02F 9/24* (2013.01)

(56) References Cited

U.S. PATENT DOCUMENTS

| | | | | |
|---|---|---|---|---|
| 8,145,355 B2* | 3/2012 | Danko | .................... | E02F 3/439 |
| | | | | 700/262 |
| 8,428,832 B2* | 4/2013 | Marathe | ................ | E02F 9/2217 |
| | | | | 701/50 |
| 8,515,627 B2* | 8/2013 | Marathe | .................. | E02F 3/431 |
| | | | | 701/50 |
| 8,660,758 B2* | 2/2014 | Janardhan | .............. | B25J 9/1638 |
| | | | | 177/139 |
| 8,903,689 B2* | 12/2014 | Dunbabin | ............... | E02F 9/265 |
| | | | | 703/6 |
| 8,909,437 B2* | 12/2014 | Zhu | ........................ | E02F 3/435 |
| | | | | 701/87 |
| 8,924,094 B2* | 12/2014 | Faivre | .................. | G01G 19/083 |
| | | | | 172/465 |
| 9,091,586 B2* | 7/2015 | Hague | .................. | G01G 19/083 |
| 9,157,216 B2* | 10/2015 | Seki | ........................ | G01S 19/23 |
| 9,481,984 B2* | 11/2016 | Iwamura | .................. | G01D 5/14 |
| 9,540,789 B2* | 1/2017 | Urbanowicz | ............. | E02F 3/32 |
| 9,644,346 B2* | 5/2017 | Seki | ........................ | E02F 3/435 |
| 9,797,111 B2* | 10/2017 | Kami | ..................... | E02F 9/2033 |
| 9,938,692 B2* | 4/2018 | Shatters | .................. | E02F 9/264 |
| 10,048,154 B2* | 8/2018 | Claxton | ................ | G01L 25/00 |
| 10,221,542 B2* | 3/2019 | Lee | .......... | E02F 3/308 |
| 10,234,368 B2* | 3/2019 | Cherney | .................. | G01N 9/02 |
| 10,301,794 B2* | 5/2019 | Moriki | ...................... | E02F 3/32 |
| 10,738,441 B2* | 8/2020 | Lindskov | .............. | E02F 9/2029 |
| 10,745,889 B2* | 8/2020 | Nishimura | .............. | E02F 9/264 |
| 10,801,177 B2* | 10/2020 | Ready-Campbell | ........................ | |
| | | | | G05D 1/0274 |
| 10,982,415 B2* | 4/2021 | Leslie | .................... | G01G 23/48 |
| 11,009,522 B2* | 5/2021 | Currier | ............... | G01P 15/0802 |
| 11,047,109 B2* | 6/2021 | Frank | ...................... | G01F 22/00 |
| 11,131,083 B2* | 9/2021 | Gratton | ...................... | E02F 9/26 |
| 11,214,939 B2* | 1/2022 | Remmelmann | ......... | E02F 3/422 |
| 11,226,225 B2* | 1/2022 | Sherlock | .................. | G01G 23/01 |
| 2008/0169131 A1* | 7/2008 | Takeda | .................... | G01G 19/10 |
| | | | | 177/136 |
| 2008/0319710 A1* | 12/2008 | Hsu | ....................... | G01G 19/083 |
| | | | | 702/174 |
| 2009/0139119 A1* | 6/2009 | Janardhan | ............ | G01G 19/021 |
| | | | | 37/413 |
| 2009/0143896 A1* | 6/2009 | Janardhan | ............... | E02F 9/264 |
| | | | | 37/413 |
| 2012/0130599 A1* | 5/2012 | Faivre | ..................... | E02F 9/265 |
| | | | | 701/50 |
| 2013/0158789 A1* | 6/2013 | Seki | ........................ | G01S 19/23 |
| | | | | 701/34.4 |
| 2013/0346127 A1* | 12/2013 | Jensen | .................... | G06Q 10/06 |
| | | | | 701/1 |
| 2014/0019015 A1* | 1/2014 | Claxton | .................. | E02F 9/006 |
| | | | | 701/50 |
| 2014/0060939 A1* | 3/2014 | Eppert | ..................... | E02F 3/342 |
| | | | | 177/139 |
| 2014/0088822 A1* | 3/2014 | Jensen | ..................... | G01N 9/36 |
| | | | | 702/23 |
| 2014/0088838 A1* | 3/2014 | Furem | .................... | G01G 19/08 |
| | | | | 701/50 |
| 2014/0107841 A1* | 4/2014 | Danko | .................. | B25J 9/1607 |
| | | | | 700/253 |
| 2014/0107897 A1* | 4/2014 | Zhu | ........................ | E02F 9/264 |
| | | | | 701/50 |
| 2014/0167971 A1* | 6/2014 | Stanley | ................. | E02F 9/2296 |
| | | | | 340/666 |
| 2015/0354177 A1* | 12/2015 | Shatters | ................... | E02F 3/422 |
| | | | | 414/815 |
| 2016/0223387 A1* | 8/2016 | Talmaki | ............... | G01G 19/083 |
| 2018/0210454 A1* | 7/2018 | Ready-Campbell | .... | G06T 17/05 |
| 2018/0274210 A1* | 9/2018 | Nishimura | ........... | G01G 19/083 |
| 2019/0226175 A1* | 7/2019 | Mairet | ..................... | E02F 3/422 |
| 2020/0032490 A1* | 1/2020 | Ready-Campbell | .... | E02F 9/262 |
| 2020/0040555 A1* | 2/2020 | Hageman | .................. | G01C 9/06 |
| 2020/0087893 A1* | 3/2020 | Hageman | ................. | E02F 9/268 |
| 2021/0032838 A1* | 2/2021 | Ready-Campbell | .... | E02F 9/205 |
| 2021/0381201 A1* | 12/2021 | Hofmann | ................ | E02F 9/262 |

\* cited by examiner

SYSTEM AND METHOD FOR DETERMINING THE MASS OF A PAYLOAD MOVED BY A WORKING DEVICE

BACKGROUND OF THE INVENTION

The present invention relates to a system and to a method for determining the mass of a payload moved by a working device, in particular the payload received by a bucket of an excavator.

In larger construction projects, it is often necessary to excavate earth material and transport away the excavated material. For this purpose, the excavated earth is loaded onto lorries, with this typically being carried out by means of excavators. In order for this to be as efficient as possible, the lorries to be loaded with the earth need to be loaded up to their maximum permissible loading capacity. However, it is problematic here that no information is provided on the mass or weight of the earth loaded onto a lorry by an excavator, and therefore the lorries are generally overloaded or underloaded. If the lorry is overloaded, material needs to be removed from the excavator again in order to relieve some of the load thereon and to ensure that the lorry is operated safely.

In the present case, therefore, the problem addressed by the load-mass estimation according to the invention is to estimate the load mass received by the excavator shovel (or bucket of the excavator). This makes it possible to load lorries very precisely up to their maximum permissible transport weight with greater safety with regard to the mass to be loaded and thus to ensure that the excavated material is excavated and conveyed away as effectively as possible.

Two different approaches that make load-mass estimation possible are essentially known from the prior art. In the first, a characteristic map of the cylinder forces can be recorded over the working area of the excavator arm, with a first characteristic map being prepared over the angles of the excavator arm only with the tool in the unloaded state and a further characteristic map being prepared over the angles of said excavator arm in the loaded state. In this case, the reference load received in the excavator bucket is intended to have the maximum permissible mass. The two characteristic maps are prepared for certain movements and therefore only apply to these movements with any accuracy. Differing speeds, angular positions and accelerations distort the result of the load-mass estimation that is then identified by means of interpolation.

The second possibility is a model-based approach. In this case, the torques on the links of the equipment and of the excavator or excavator arm are calculated by means of the cylinder pressures. Furthermore, the theoretically applied torques are identified by means of the equations of motion, the measured and the model-based torques reproducing information relating to the load mass.

Examples of the model-based approach are found in U.S. Pat. No. 7,912,612 B2, U.S. Pat. No. 8,909,437 B2 or U.S. Pat. No. 8,660,758.

It is a drawback that the known prior art set out above by way of example requires reference runs or calibration runs, which are necessary before estimating the load mass, for the parameters of the equations of motion.

SUMMARY OF THE INVENTION

The aim of the present invention is to provide an improved method and an improved system for load-mass estimation that makes it possible to estimate the load mass with reference runs or calibration runs.

This is made possible by the system, which has all the features herein. Accordingly, the system for determining the mass of a payload moved by a working device of a machine comprises a lifting-gear element that is movable along a path and is designed to move the working device; a sensor system that is designed to provide a plurality of machine-status signals which indicate a status of the machine; a force sensor system that is designed to provide a lifting-force signal that indicates a force on the lifting-gear element; and a control device that is designed to use system parameters for load determination that originate from CAD data, preferably CAD data that has been pre-configured at the factory, and/or from continuous calibration of system parameters; to carry out calibration using the pre-configured parameters as initialisation if unsatisfactory results are achieved; to carry out the calibration in an unloaded state, i.e. when the working device is empty, with automatically predefined stimulation trajectories being used for the machine or instructions being provided to the operator for stimulating the parameters; to log the system statuses using the sensors and to carry out a system identification of this information; and to determine a mass of the payload on the basis of identified and/or pre-configured system parameters and system statuses, preferably on the basis of a position, a speed, an acceleration of the lifting-gear element and/or a force or torque on the lifting-gear element.

Owing to the invention, it is therefore no longer necessary to make calibration runs or initialisation runs, which were previously necessary for identifying all or some of the system parameters, before estimating the load mass. By contrast, the invention proposes initialising the system parameters using CAD data which can be predetermined at the factory, for example. Subsequent calibrations can use these data as starting values for determining the new system parameters.

It is further proposed to continuously update the system parameters by means of estimation processes, the estimation processes preferably being repeated in a predetermined scope, i.e. a certain number of repetitions. According to an optional development of the invention, the control device is further designed to receive the machine-status signals from the working device while the working device is being moved on a multi-dimensional, preferably three-dimensional track.

More advantageously, the control device is designed to use pre-configured system parameters on the basis of CAD data and/or to carry out a system identification procedure and to determine the mass of the payload at least in part on the basis of said system parameters.

The control device is preferably designed to recalibrate the system parameters using the CAD data as initialisation, and/or to automatically identify the parameters of the system by using predefined trajectories of the working device, and/or to identify the parameters of the system by instructions being provided to the operator for how the working device is to be moved, in order to stimulate the parameters to be identified.

According to a preferred embodiment of the system according to the invention, the system further comprises an actuator operatively connected to a lifting-gear element, and preferably further comprises a pivot element and a working-device system which comprises the lifting-gear element and comprises a boom element, a stick element, and the working device.

In this case, it may be provided that the machine-status signals include an angular position, an angular speed and/or an angular acceleration of the pivot element, the boom element, the stick element and/or the working device, the machine-status signals preferably including at least one yaw and one roll of the machine.

Preferably, the parameters of the machine system are based at least in part on an inertia and/or a mass of the boom, the stick and the working device.

According to a development of the invention, the system parameters are based at least in part on a position of a centre of gravity of the boom element, the stick element and the working device, the position being arranged in a coordinate system which has its origin in a respectively associated rotating link, and an X axis of the coordinate system being aligned with the rotating links of a current and a following element, a Z axis of the coordinate system coinciding with the rotational axis of the rotating link of a current element, and a Y axis of the coordinate system being selected such that a right-angled coordinate system, preferably a right-handed coordinate system, results. In this case, the rotating link may be a hinged link that only allows rotation about one axis, as implemented on an excavator arm, for example. The excavator arm namely consists of a plurality of elements, which can each only pivot relative to one another about one axis.

The invention further relates to a method, in particular a method implemented in a control device, for determining the mass of a payload moved by a working device of a machine, comprising the steps of: using predefined system parameters for load determination which are based on CAD data, and/or carrying out a recursive identification of the system parameters during work cycles with the working device unloaded; determining the torque on the lifting-gear element and working-device statuses for identifying the system parameters for the unloaded machine while the working device is being moved; carrying out the system identification recursively or using an identification method for the unloaded machine; receiving a second set of loaded machine-status signals when the working device is being moved in the loaded state; determining a machine status with a loaded working device on the basis of the second set of loaded machine-status signals; determining the torques on the working device using the force on the lifting-gear element; calculating the theoretical torque on the working device on the basis of the system parameters for the unloaded case; and determining a mass of the payload, at least in part on the basis of the system parameters, the machine statuses with the loaded working device and a lifting force when the working device is loaded. According to a development of the method, the working device is moved along a three-dimensional track while the first set of unloaded machine-status signals is being received.

In addition, it is conceivable for the possible initialisation of the system parameters using CAD data to be carried out for the system identification, and/or the pre-configured parameters from CAD data to be used for the system parameters.

According to an optional modification of the invention, a torque on a rotating link of the lifting-gear element is determined at least in part on the basis of the lifting force and the machine-system parameters are determined at least in part on the basis of the identified torque, wherein, in the method, a torque of the loaded working device is preferably determined on the rotating link of the lifting-gear element, which torque is based at least in part on the lifting force of the loaded lifting-gear element, and the mass of the payload, which is based at least in part on the torque of the loaded working device, is determined; and/or the mass of the payload is preferably determined at least in part on the basis of the system parameters.

Furthermore, it may be provided that the current movement of the working device is evaluated and the estimation of the load mass is displayed only under suitable conditions. Therefore, some movements, which do not entail stimulation of the corresponding parameters, are not suitable for use in a load-mass estimation.

Furthermore, it may be provided here that a pivot element and a working-device system comprising a boom element, a stick element and the working device are provided, and the working-device system is positioned differently while the working device is being moved along a multi-dimensional, preferably three-dimensional track in an unloaded state, the working device preferably repeating the movement in the unloaded state with a predetermined frequency and/or the movement of the working device being executed autonomously or it being demonstrated to the operator how they are to move the working device.

The invention relates to a machine comprising a working device; a lifting-gear element that is movable along a track and is operatively connected to the working device in order to move the working device; a sensor system that is designed to provide a plurality of machine-status signals which indicate a status of the machine; a force sensor system that is designed to provide a lifting-force signal that indicates a force on the lifting-gear element; and a control device that is designed: to use predefined system parameters for load determination which are based on CAD data, and/or to carry out recursive identification of the system parameters during work cycles with the working device unloaded; to determine the torque on the lifting-gear element and working-device statuses for identifying the system parameters for the unloaded machine while the working device is being operated; to carry out the system identification recursively or using an identification procedure for the unloaded machine; to receive a second set of loaded machine-status signals when the working device is being moved in a loaded state; to determine a machine status of a loaded working device on the basis of the second set of loaded machine-status signals; to determine the torques on the working device using the force on the lifting-gear element; to calculate the theoretical torque on the working device on the basis of the system parameters for the unloaded case; and to determine a mass of the payload, at least in part on the basis of the system parameters, the machine statuses of the loaded working device and the lifting force of the loaded working device.

The invention further relates to a method, in particular a method implemented in a control device, for determining machine-system parameters of a machine, wherein the machine comprises a pivot element and a working-device system comprising a boom element, a stick element and a working device, wherein the method comprises the steps of: rotating the pivot element relative to a frame element, preferably a chassis, while the boom element, the stick element and the working device are being moved in an unloaded state according to a predefined trajectory; receiving a set of unloaded machine-status signals when the pivot element is rotated and the boom element, the stick element and the working device are being moved in the unloaded state; determining a system-machine status on the basis of the set of the unloaded machine-status signals; determining a lifting force on a lifting-gear element on the basis of a lifting-gear force signal that is generated when the working device is being moved in the unloaded state; and determining machine-system parameters on the basis of the machine status and the lifting force, wherein, in the method, a static system identification is preferably carried out in which the boom element, the stick element and the working device dwell in a plurality of different positions, and/or the stick element is moved relative to the boom element during a rotation of the pivot element and a movement of the boom element.

In summary, it can be said that the main difference from the known prior art is that no calibration is now necessary to carry out the load estimation. In this case, according to the invention, the parameters are first initialised from CAD data using the system parameters. A calibration can be carried out if the performance of the load estimation drops. The predetermined system parameters can still be used as starting values for the system identification and/or the calibration. In addition, continuous calibration can also be carried out during a work cycle when the working device is unloaded.

Preferably, it is to be noted that the terms machine condition and system condition have the same meaning and can be used equivalently. The same applies to the terms system parameters and parameters, which have the same meaning.

BRIEF DESCRIPTION OF THE DRAWINGS

Further details, features and advantages of the invention are clear from the following description of the figures. In the drawings.

DESCRIPTION OF THE PREFERRED EMBODIMENTS

Equations of Motion

Figure 1:
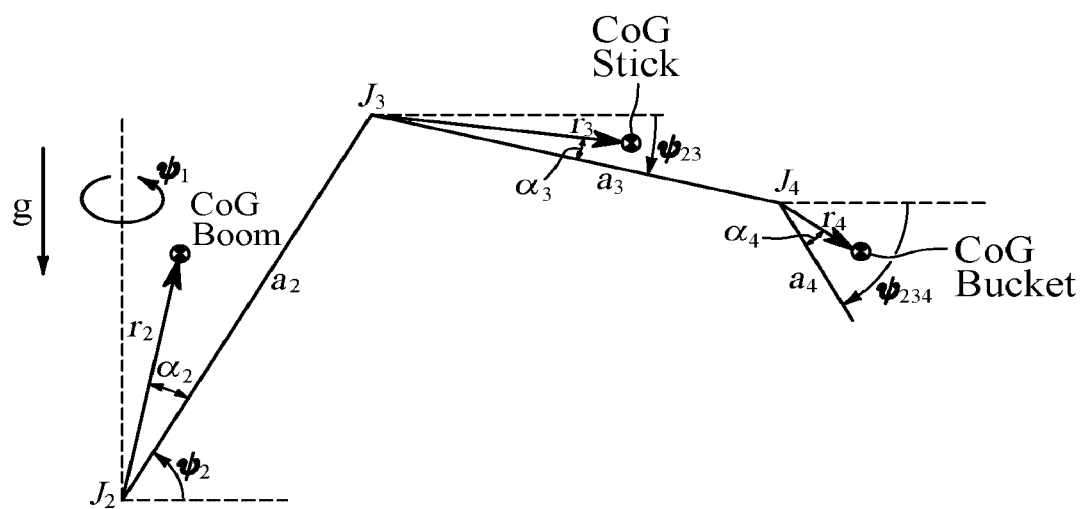
FIG. 1 is a schematic view of an excavator.

In order to determine the influence of the load on the acting torque, the torque due to the system must be known. It is useful to calculate the torque of the system using a model of the system. Here, the dynamics is set out by the equations of motion, which can be formulated using proven methods such as the NEWTON-EULER method or the second-order LAGRANGE equations. Generally, in this case, equations of motion in the form $$\tau = D(q)\ddot{q} + C(q,\dot{q})\dot{q} + G(q) \quad (1)$$

are derived, in which q is the generalised coordinates, $\tau$ is the torque, D is the mass matrix, C is the matrix of the centrifugal and Coriolis forces and G is the gravitational moment vector. In this case, the generalised coordinates q are the angles of rotation of the individual components of the excavator. FIG. 1 is a schematic view of the excavator, taking into account the boom, the stick and the bucket, and the rotation of the upper structure.

The index i=1 represents the upper structure, i=2 represents the boom, i=3 represents the stick and i=4 represents the bucket. The angles of rotation are described by $\psi_1$, $J_i$ is the ith link and $a_i$ is the distance from link i+1 to i. The centre of gravity (CoG) is shown over the radius $r_i$ and the angle $\alpha_i$ in the ith coordinate system of the component in question.

Figure 2:
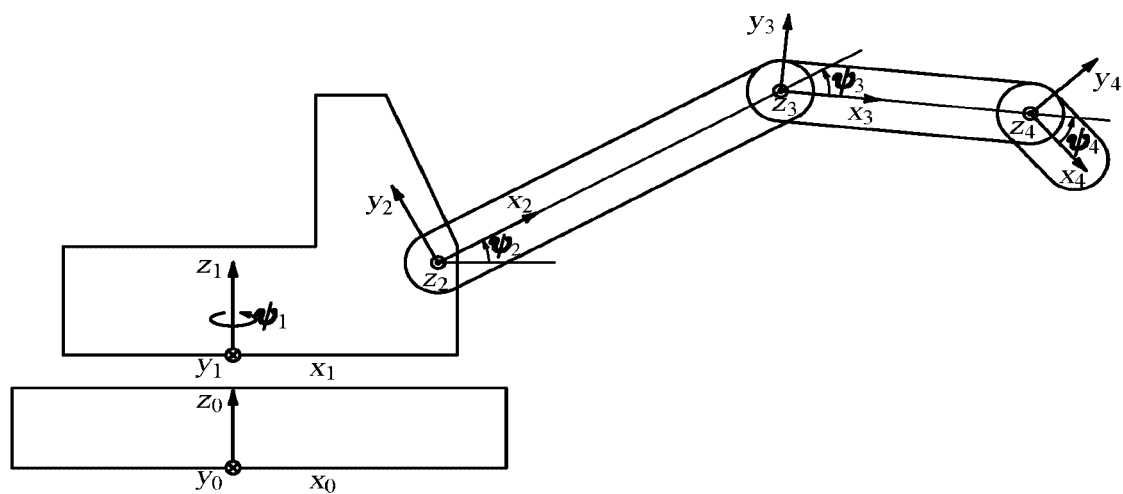
FIG. 2 shows the defined coordinate systems in a schematic excavator.

The coordinate systems are defined in FIG. 2. This description is equivalent to a description of the centres of gravity using x and y coordinates. Lastly, the gravitational acceleration g, which is considered to be stationary, is outlined. "Stationary" means that the dynamic yaw, pitch and roll of the excavator is not taken into consideration; however, this does not exclude a possible inclined position of the excavator, which is expressed in the gravitational vector.

The generalised coordinates for the present system are $$q = \begin{bmatrix} \psi_1 \\ \psi_2 \\ \psi_3 \\ \psi_4 \end{bmatrix} \text{ where } \dot{q} = \begin{bmatrix} \dot{\psi}_1 \\ \dot{\psi}_2 \\ \dot{\psi}_3 \\ \dot{\psi}_4 \end{bmatrix}, \ddot{q} = \begin{bmatrix} \ddot{\psi}_1 \\ \ddot{\psi}_2 \\ \ddot{\psi}_3 \\ \ddot{\psi}_4 \end{bmatrix}. \quad (2)$$

The non-linear equations of motion from equation (1) can be transferred into a representation that is linear in its parameters; see equation (3).

$$\tau = W(q,\dot{q},\ddot{q})\Psi \quad (3)$$

The matrix $W(q,\dot{q},\ddot{q})$ is composed of the gravitational moment vector $G(q)$, the matrix of the centrifugal and Coriolis forces $C(q,\dot{q})$ and the mass matrix $D(q)$. The vector $\Psi$ contains the parameters of the system, such as masses and inertias of the individual components. These sometimes appear in linear dependencies. In general, with this representation, a simple regression can be carried out in order to determine the parameter vector $\Psi$. In this case, W is designated as the regressor and $\Psi$ as the regressand.

Proceeding from this knowledge, the system of the excavator can likewise be transferred into such a representation. Assuming that no load is present, the relationship is $$\tau_{meas} = \tau_{sys} = W_{sys}(q,\dot{q},\ddot{q})\Psi_{sys}. \quad (4)$$

Here, $\tau_{meas}$ is the torque measured or calculated on the basis of the pressures, $\tau_{sys}$ is the torque calculated using the equation of motion and $W_{sys}$ together with $\Psi_{sys}$ are the associated regressor and regressand, respectively. If a mass is present, equation 4 is extended to $$\tau_{meas} = \tau_{sys} + \tau_{pay} = W_{sys}(q,\dot{q},\ddot{q})\Psi_{sys} + W_{pay}(q,\dot{q},\ddot{q})\Psi_{pay} \quad (5)$$

with the torque $\tau_{pay}$ owing to the load. The regressor of the load $W_{pay}$ can be derived from $W_{sys}$, while the regressand of the load $\Psi_{pay}$ is unknown. The measured moment is composed here of the total of the torques of the system and of the load. This relationship can be utilised to determine the parameter vector of the load $\Psi_{pay}$. Equation 5 can accordingly be transformed into equation 6.

$$\tau_{pay} = \tau_{meas} - \tau_{sys} \Leftrightarrow \tau_{pay} = \tau_{meas} - W_{sys}(q,\dot{q},\ddot{q})\Psi_{sys} \Leftrightarrow W_{pay}(q,\dot{q},\ddot{q})\Psi_{pay} = \tau_{meas} - W_{sys}(q,\dot{q},\ddot{q})\Psi_{sys} \quad (6)$$

With equation 6, a relationship is produced by means of which the parameter vector $\Psi_{pay}$ can be determined online using standard algorithms such as the recursive least squares algorithm. The equations of motion only take into account the open kinematic chain, i.e. the cylinders are disregarded. This, however, has an influence on the measured moment $\tau_{meas}$, which is why the torque due to the cylinders has to be subtracted from the measured torque in accordance with the explanations below.

Estimation Method

In the case in question, estimation processes, also called estimation methods, are used to estimate unknown parameters. In this method, the estimation takes place by means of measured values from an underlying system, the system having to be influenced by the parameters. Here, the mathematical description of the system may have different structures, which are accordingly utilised by the estimation methods. In the following, one particular structure is discussed, and possible estimation methods are set out.

The system
is taken into consideration. Here, the parameter vector $\Psi$ is estimated, such that the optimisation problem $$\min_{\hat{\Psi}}\left[\frac{1}{2}(y - W\Psi)^T(y - W\Psi)\right] \tag{8}$$

is solved and the cost function is minimised. The minimisation of this problem is also called the least squares method. The deviation of the measured output y and of the model output $W\Psi$ is minimised using $\Psi$. One option would be to stimulate the system and thus the parameters of the system over trajectories and to record the corresponding signals for the output and the regressor. The optimisation is then applied to the entire data set offline. In the case of load-mass estimation, a continuous estimation of the load mass is necessary, which requires recursive methods, such as the recursive least squares algorithm, to be used.

The load-mass estimation thus takes place using the recursive least squares (RLS) algorithm, which is described in equations 9 to 13.

$$\hat{\tau}(t) = W(t)\hat{\Psi}(t-1) \tag{9}$$

$$Q(t) = \frac{P(t-1)}{\lambda + W(t)P(t-1)W^T(t)} \tag{10}$$

$$K(t) = Q(t)W^T(t) \tag{11}$$

$$\hat{\Psi}(t) = \hat{\Psi}(t-1) + K(t)(\tau(t) - \hat{\tau}(t)) \tag{12}$$

$$p(t) = \frac{1}{\lambda}\left(P(t-1) - \frac{P(t-1)W^T(t)W(t)P(t-1)}{\lambda + W(t)P(t-1)W^T(t)}\right) \tag{13}$$

This is a modified variant of the RLS algorithm, which contains what is known as the forgetting factor. The forgetting factor is selected in the interval $\lambda \in [0, 1]$ and brings about a lesser influence of past measured values on the estimation. Typical values for the forgetting factor $\lambda$ are in the range $0.98 \leq \lambda \leq 0.995$. If $\lambda=1$ is selected, this gives the original RLS algorithm. The original optimisation problem $$\min_{\Psi} \sum_{k=1}^{t_{act}} (\tau(k) - W(k)\Psi)^2 \tag{14}$$

is modified to form the optimisation problem $$\min_{\Psi} \sum_{k=1}^{t_{act}} \lambda^{t_{act}-k} (\tau(k) - W(k)\Psi)^2 \tag{15}$$

where $t_{act}$ is the current sampling time. The modified optimisation problem clarifies the influence of the forgetting factor $\lambda$. For the RLS algorithm, there are a large number of extensions that may result in improvements to the estimation where necessary. Other methods for the estimation are likewise conceivable.

Identification

The system parameters are determined by the identification. Alternatively, the parameters could be obtained and calculated from the data sheets. When mounted, however, additional bodies having their own inertias are added to the individual components, such as the boom, stick and bucket. In addition, tolerances are provided that likewise bring about a deviation of the actual parameters from the parameters on the data sheet. It can thus be assumed that the CAD data are not exactly consistent with reality, and an identification of the system parameters $\Psi_{sys}$ may be necessary. This can proceed in two phases and can be implemented without a load mass. In the following, the parameter identification of the system parameters is described. Here, the static parameter identification is taken as a starting point. The dynamic parameter identification then follows. Here, the dynamic parameter identification can use the parameters from the static identification or can identify all the parameters again from scratch. A static load-mass estimation can be carried out just using the statically identified parameters. The dynamically identified parameters are required for a dynamic load-mass estimation.

Static Parameter Identification

First, a static identification can be carried out. Proceeding from equation 7, for the static case, the structure $$\tau = \begin{bmatrix} \tau_{meas,2} \\ \tau_{meas,3} \\ \tau_{meas,4} \end{bmatrix} \tag{16}$$

$$W = g_z \begin{bmatrix} c(\psi_{234}) & -s(\psi_{234}) & 0 & 0 & 0 & 0 \\ c(\psi_{234}) & -s(\psi_{234}) & c(\psi_{23}) & -s(\psi_{23}) & 0 & 0 \\ c(\psi_{234}) & -s(\psi_{234}) & c(\psi_{23}) & -s(\psi_{23}) & c(\psi_2) & -s(\psi_2) \end{bmatrix}$$

$$\Psi = \begin{bmatrix} m_4 r_{4,x} \\ m_4 r_{4,y} \\ m_4 a_{3,x} + m_3 r_{3,x} \\ m_3 r_{3,y} \\ (m_4 + m_3)a_{2,x} + m_2 r_{2,x} \\ m_2 r_{2,y} \end{bmatrix}$$

follows, with $c(\bullet)=\cos(\bullet)$, $s(\bullet)=\sin(\bullet)$ and the gravitational acceleration $g_z$ 9.81 m/s². It is assumed that the excavator is standing level, which is why only the Z component of the gravitational acceleration is taken into consideration in the coordinate system 0. If the assumption is incorrect, the regressor W must be adapted according to the position of the excavator. An alternative to the structure in equation 17 is $$\tau = \begin{bmatrix} \tau_{meas,2} - \tau_{meas,3} \\ \tau_{meas,3} - \tau_{meas,4} \\ \tau_{meas,4} \end{bmatrix} \tag{17}$$

$$W = g_z \begin{bmatrix} c(\psi_{234}) & -s(\psi_{234}) & 0 & 0 & 0 & 0 \\ 0 & 0 & c(\psi_{23}) & -s(\psi_{23}) & 0 & 0 \\ 0 & 0 & 0 & 0 & c(\psi_2) & -s(\psi_2) \end{bmatrix}$$

$$\Psi = \begin{bmatrix} m_4 r_{4,x} \\ m_4 r_{4,y} \\ m_4 a_{3,x} + m_3 r_{3,x} \\ m_3 r_{3,y} \\ (m_4 + m_3)a_{2,x} + m_2 r_{2,x} \\ m_2 r_{2,y} \end{bmatrix},$$

which results in a new regressor due to the moment difference and thus assures an improved condition due to the block diagonal structure. For the static identification, a large number of different configurations of the equipment should be covered. On the basis of the measured data, the identification can lastly be carried out using the least squares method, for example.

The dynamic parameter identification may take place on the basis of the results of the static parameter identification, or directly. In addition, the parameters can be initialised using the CAD data and the parameters of the static identification. If parameters are known, the structure $$\tau_{meas} = \tau_{sys} = W_{sys}\Psi_{sys} = \tag{18}$$

$$W_{kwn}\Psi_{kwn} + W_{uwkn}\Psi_{uwkn} \Leftrightarrow (\tau_{meas} - W_{kwn}\Psi_{kwn}) = W_{uwkn}\Psi_{uwkn}$$

where $$\Psi_{sys} = \begin{bmatrix} \Psi_{wkn} \\ \Psi_{uwkn} \end{bmatrix}$$

$$W_{sys} = [W_{kwn} \quad W_{uwkn}]$$

can be used. The parameter vector $\Psi$ and the regressor W are separated into known parts ($\Psi_{kwn}$ and $W_{kwn}$) and unknown parts ($\Psi_{ukwn}$ and $W_{ukwn}$). Here, the known parameters may originate from the static identification or the CAD data. Alternatively, the RLS algorithm can be initialised using known parameters as starting values, in order to thus achieve improved identification.

In order for it to be possible to identify the system parameters, sufficient stimulation of the system is required. Insufficient stimulation means a poor condition number of the regressor, which negatively affects the identified parameters. Sinusoidal trajectories have become established in robotics for stimulation and identification. Equation 19 demonstrates such a trajectory, having the parameters $b_{i,k}$ and $c_{i,k}$, the fundamental frequency f, the angular offset $\psi_{i,0}$ and the number of harmonics N taken into account.

$$\psi_i(t) = \sum_{k=1}^{N} b_{i,k}\sin(2\pi kft) + c_{i,k}\cos(2\pi kft) + \psi_{i,0} \tag{19}$$

$$\dot{\psi}_i(t) = \sum_{k=1}^{N} (2\pi kf)b_{i,k}\cos(2\pi kft) - (2\pi kf)c_{i,k}\sin(2\pi kft)$$

$$\ddot{\psi}_i(t) = \sum_{k=1}^{N} -(2\pi kf)^2 b_{i,k}\sin(2\pi kft) - (2\pi kf)^2 c_{i,k}\cos(2\pi kft)$$

The parameters $b_{i,k}$ and $c_{i,k}$ are determined by an optimisation. The fundamental frequency f and the number of harmonics N can specified in advance. The mechanical structure should not be stimulated, which results in a limitation of the highest frequency. The optimisation problem can be formulated as $$\underset{b_{i,k}, c_{i,k}}{\text{minimize}} \; \kappa(W) = \|W\| \|W^{-1}\| \tag{20}$$

$$\text{or} \; -\log\left(\det\left(W^T W\right)\right)$$

$$\text{subject to} \; \psi_{i,min} \le \psi_i(t) \le \psi_{i,max}, \quad \forall \, i, t,$$
$$\dot{\psi}_{i,min} \le \dot{\psi}_i(t) \le \dot{\psi}_{i,max}, \quad \forall \, i, t,$$
$$\ddot{\psi}_{i,min} \le \ddot{\psi}_i(t) \le \ddot{\psi}_{i,max}, \quad \forall \, i, t,$$
$$\psi_i(t_0) = \psi_i(t_f) = 0, \quad \forall \, i, t,$$
$$\dot{\psi}_i(t_0) = \dot{\psi}_i(t_f) = 0, \quad \forall \, i, t,$$
$$\ddot{\psi}_i(t_0) = \ddot{\psi}_i(t_f) = 0, \quad \forall \, i, t,$$

One option for solving the problem is using the Monte Carlo method (random sampling), in which a plurality of starting values are generated for the parameters and promising trajectories are then selected. These are then optimised using standard optimisation methods (in Matlab e.g. with fmincon) taking into account the restrictions. There are further modifications to the optimisation problem in order to take into account noise from the sensors, for example, since noise influences the condition number. Lastly, the planned trajectory can be used for the identification and the necessary data can be recorded for the identification. Necessary data would be the pressures of the cylinders, the angles, the angular speeds and the angular accelerations. The regressor and the output can be derived therefrom and the estimation can be executed by the least squares method, for example.

Load-Mass Estimation

The estimation method set out is then applied to the established equations of motion. In this case, the identified system parameters $\Psi_{sys}$ are used. The structure of equation 7 is already provided in equation 6. Equation 21 again shows the relationship.

$$\underbrace{W_{pay}(q, \dot{q}, \ddot{q})}_{w} \underbrace{\Psi_{pay}}_{\Psi} = \underbrace{\tau_{meas} - W_{sys}(q, \dot{q}, \ddot{q})\Psi_{sys}}_{\tau} \tag{21}$$

By means of this, the load mass can then be determined using the RLS algorithm. The parameter vector of the load $\Psi_{pay}$ is composed of the load mass $m_{pay}$ the linear combination of load mass and centre of gravity position $r_{pay,i}m_{pay}$ and the inertias $I_{pay,ij}$ and is defined in equation 22. The parameter vector of the system $\Psi_{sys}$ is described in the following.

$$\Psi_{pay} = \begin{bmatrix} m_{pay} \\ r_{pay,x}m_{pay} \\ r_{pay,y}m_{pay} \\ r_{pay,z}m_{pay} \\ I_{pay,xx} \\ I_{pay,xy} \\ I_{pay,xz} \\ I_{pay,yy} \\ I_{pay,yz} \\ I_{pay,zz} \end{bmatrix} \tag{22}$$

Which equations of motion are suitable for identifying a parameter can be ascertained on the basis of the regressor $$W_{pay} = \begin{bmatrix} w_{1,1} & w_{1,2} & w_{1,3} & w_{1,4} & w_{1,5} & w_{1,6} & w_{1,7} & w_{1,8} & w_{1,9} & w_{1,10} \\ w_{2,1} & w_{2,2} & w_{2,3} & w_{2,4} & w_{2,5} & w_{2,6} & w_{2,7} & w_{2,8} & w_{2,9} & w_{2,10} \\ w_{3,1} & w_{3,2} & w_{3,3} & w_{3,4} & w_{3,5} & w_{3,6} & w_{3,7} & w_{3,8} & w_{3,9} & w_{3,10} \\ w_{4,1} & w_{4,2} & w_{4,3} & w_{4,4} & w_{4,5} & w_{4,6} & w_{4,7} & w_{4,8} & w_{4,9} & w_{4,10} \end{bmatrix} \tag{23}$$

It is only possible to identify a parameter if said parameter is also stimulated, i.e. $w_{i,j} \ne 0$ must apply to the input in the regressor. Which inputs differ from zero ultimately depends on the system and the movements. Various options come about for estimating the load $m_{pay}$ by means of the equations of motion. First, the normal moments $$\tau = \begin{bmatrix} \tau_{meas,2} \\ \tau_{meas,3} \\ \tau_{meas,4} \end{bmatrix} \tag{24}$$

or again the difference moments $$\tau = \begin{bmatrix} \tau_{meas,2} - \tau_{meas,3} \\ \tau_{meas,3} - \tau_{meas,4} \\ \tau_{meas,4} \end{bmatrix} \tag{25}$$

can be used for the estimation. The difference moments provide the advantage that fewer singularities can occur and the regressor has more zero elements. It should be noted that the load mass does not emerge in every equation of motion for the links in question. For the last component on which the load is positioned, the mass of the load $m_{pay}$ only occurs in linear combination with the centre of gravity ($r_{pay,x}m_{pay}$, $r_{pay,y}m_{pay}$ and $r_{pay,z}m_{pay}$). For the other components, the mass of the load $m_{pay}$ is explicitly present. The actual load mass $m_{pay}$ can thus only be determined by means of the torque equations of the boom or the stick, the regressors of which are occupied as follows:

$$W_{pay,i}=[w_{i,1}\ w_{i,2}\ w_{i,3}\ w_{i,4}\ 0\ 0\ 0\ 0\ 0\ 0]\ \text{for } i=2,3 \quad (26)$$

The index i describes the row of the regressor $W_{pay}$ and $w_{i,j}$, where j=1, 2, 3, 4, are the column elements of the regressor. If equation 26 is compared with the parameter vector of the load from equation 22, a stimulation of the load $m_{pay}$ as well as the linear combinations of load and centre of gravity $r_{pay,x}m_{pay}$, $r_{pay,y}m_{pay}$ and $r_{pay,z}m_{pay}$ can be identified. The regressor $$W_{pay,4}=[0\ w_{4,2}\ w_{4,3}\ w_{4,4}\ w_{4,5}\ w_{4,6}\ w_{4,7}\ w_{4,8}\ w_{4,9}\ w_{4,10}] \quad (27)$$

is present for the bucket, which is the component to which the load is applied. As already explained, the load mass $m_{pay}$ is not stimulated ($w_{4,1}=0$) and thus cannot be determined by means of the torque equation of the bucket. However, the other inputs of the parameter vector $\Psi_{pay}$ are stimulated. If the inputs of the regressor are analysed in greater detail, permanent stimulation of the load mass can be seen by the regressor inputs $w_{2,1}$, $w_{3,1}$, $w_{4,2}$, $w_{4,3}$ and $w_{4,4}$. The other inputs only occur at speeds and accelerations. There are two variants for estimating the load mass:

Variant A:

Using the torque equation of the boom or stick. All the stimulated parameters of the parameter vector are estimated. The parameter $r_{pay,z}m_{pay}$ can optionally be disregarded, since the centre of gravity of the load should not deviate significantly from zero.

Variant B:

Using the torque equation of the boom or stick and of the bucket. The equation of motion of the bucket provides the advantage of permanently stimulating the parameters $r_{pay,x}m_{pay}$, $r_{pay,y}m_{pay}$ and $r_{pay,z}m_{pay}$. For this reason, more precise estimation of the parameters is to be expected. These can then be taken into account in the equations of motion of the boom or stick.

Figure 3:
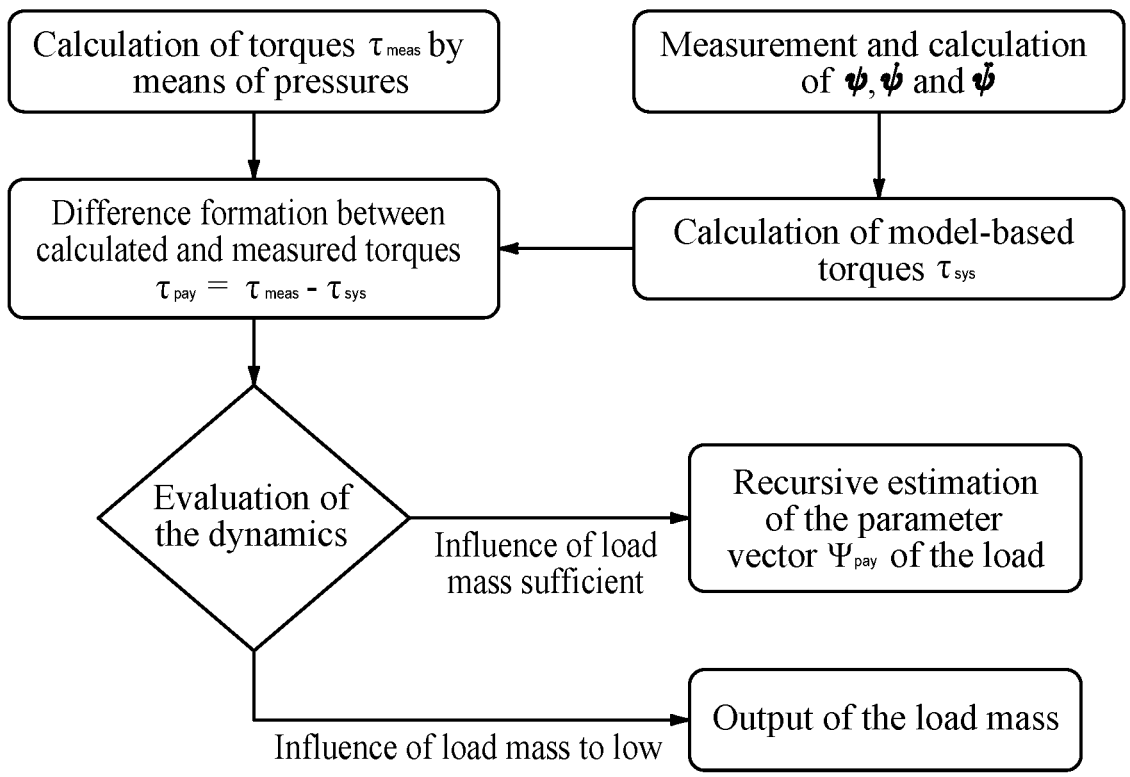
FIG. 3 is a flow diagram of the load-mass estimation.

A combination of the parameter estimations by means of the equations of motion of the boom and stick would also be conceivable. With high accelerations, the influence of the load decreases while the influence of the other inputs increases. If the estimations are significantly distorted, the regressor elements can be monitored and the estimation can be paused. FIG. 3 shows a summary of the entire sequence of the load-mass estimation.

The parameter vectors should be set out in detail. The parameter vector of the system is composed of 24 parameters; see equation 28.

$$\Psi_{sys}=[\Psi_{sys,1}\ \Psi_{sys,2}\ \ldots\ \Psi_{sys,23}\ \Psi_{sys,24}]^T \quad (28)$$

The parameter vector $\Psi_{sys}$ consists of inertias $I_i$, masses $m_i$ and position information $a_i$ and $r_i$, with $a_i$ being assumed to be known (for definitions, see below under equations of motion). The parameters occur explicitly and/or in linear combinations, as can be seen in equation 29.

$\Psi_{sys,1}=I_{4,xx}=I_{4,yy}$ $\Psi_{sys,2}=I_{4,xy}$ $\Psi_{sys,3}=I_{4,xz}$ $\Psi_{sys,4}=I_{4,yz}$ $\Psi_{sys,5}=I_{4,zz}$ $\Psi_{sys,6}=r_{4,x}m_4$ $\Psi_{sys,7}=r_{4,y}m_4$ $\Psi_{sys,8}=I_{3,xx}-I_{3,yy}-a_{3,x}^2 m_4$ $\Psi_{sys,9}=I_{3,xy}$ $\Psi_{sys,10}=I_{3,xz}-a_{3,x}r_{4,z}m_4$ $\Psi_{sys,11}=I_{3,yz}$ $\Psi_{sys,12}=I_{3,zz}+a_{3,x}^2 m_4$ $\Psi_{sys,13}=r_{3,x}m_3+a_{3,x}m_4$ $\Psi_{sys,14}=r_{3,y}m_3$ $\Psi_{sys,15}=I_{2,xx}-I_{2,yy}-a_{2,x}^2 m_3-a_{2,x}^2 m_4$ $\Psi_{sys,16}=I_{2,xy}$ $\Psi_{sys,17}=I_{2,xz}-a_{2,x}r_{3,z}m_3-a_{2,x}r_{4,z}m_4$ $\Psi_{sys,18}=I_{2,yz}$ $\Psi_{sys,19}=I_{2,zz}+a_{2,x}^2 m_3+a_{2,x}^2 m_4$ $\Psi_{sys,20}=r_{2,x}m_2+a_{2,x}m_3+a_{2,x}m_4$ $\Psi_{sys,21}=r_{2,y}m_2$ $\Psi_{sys,22}=I_{1,zz}+I_{2,yy}+I_{3,yy}+I_{4,yy}+(a_{1,x}^2+a_{1,y}^2)m_2+(a_{1,x}^2+a_{1,y}^2+a_{2,x}^2)m_3+(a_{1,x}^2+a_{1,y}^2+a_{2,x}^2+a_{3,x}^2)m_4$ $\Psi_{sys,23}=r_{1,x}m_1+a_{1,x}m_2+a_{1,x}m_3+a_{1,x}m_4$ $\Psi_{sys,24}=a_{1,y}m_2+a_{1,x}m_3+a_{1,z}m_4 \quad (29)$ This representation has been established using the open source Python library SymPy-Botics. The system is described using the Denavit-Hartenberg transformation and a gravitational vector is provided. The equations of motion are subsequently prepared and the parameter vector is numerically derived therefrom. It should be noted that symbolic methods also exist for this purpose. The library does not permit any variable gravitational acceleration, however. For this reason, the equations of motion were also established in Matlab with the Symbolic Toolbox and the representation linearly in the parameters was derived with variable gravitational acceleration. The described parameter vector can be extended and coefficients of friction can be simultaneously estimated, for example. As an example, the sliding friction in the links $$\tau_{i,reib}=\psi_i\mu_i,\ \text{where } i=1,\ldots,4 \quad (30)$$

could be simultaneously estimated by adapting the regressor $W_{sys}$ and the parameter vector $\Psi_{sys}$. The new parameter vector can be seen in equation 31.

$$\Psi_{sys,ext}=[\Psi_{sys,1}\ \Psi_{sys,2}\ \ldots\ \Psi_{sys,23}\ \Psi_{sys,24}\ \mu_1\ \mu_2\ \mu_3\ \mu_4]^T \quad (31)$$

Here, the regressor must be adapted by the angular speeds of the respective links; see equation 32.

$$\begin{bmatrix} \tau_{meas,1} \\ \tau_{meas,2} \\ \tau_{meas,3} \\ \tau_{meas,4} \end{bmatrix} = \underbrace{W_{sys} \begin{bmatrix} \dot{\psi}_1 & 0 & 0 & 0 \\ 0 & \dot{\psi}_2 & 0 & 0 \\ 0 & 0 & \dot{\psi}_3 & 0 \\ 0 & 0 & 0 & \dot{\psi}_4 \end{bmatrix}}_{w_{sys,ext}} \Psi_{sys,ext} \quad (32)$$

Cylinder Mass Compensation

The formulated equations of motion only contain the open kinematic chain. The cylinders are not taken into account; however, the measured pressures contain the inertias and the masses of the cylinders, and this distorts the calculated torque $\tau_{meas}$. Therefore, compensation of the torque is necessary in order to take into account the effects of the cylinders. A representation of the required values for the compensation is provided in FIG. 4.

Figure 4:
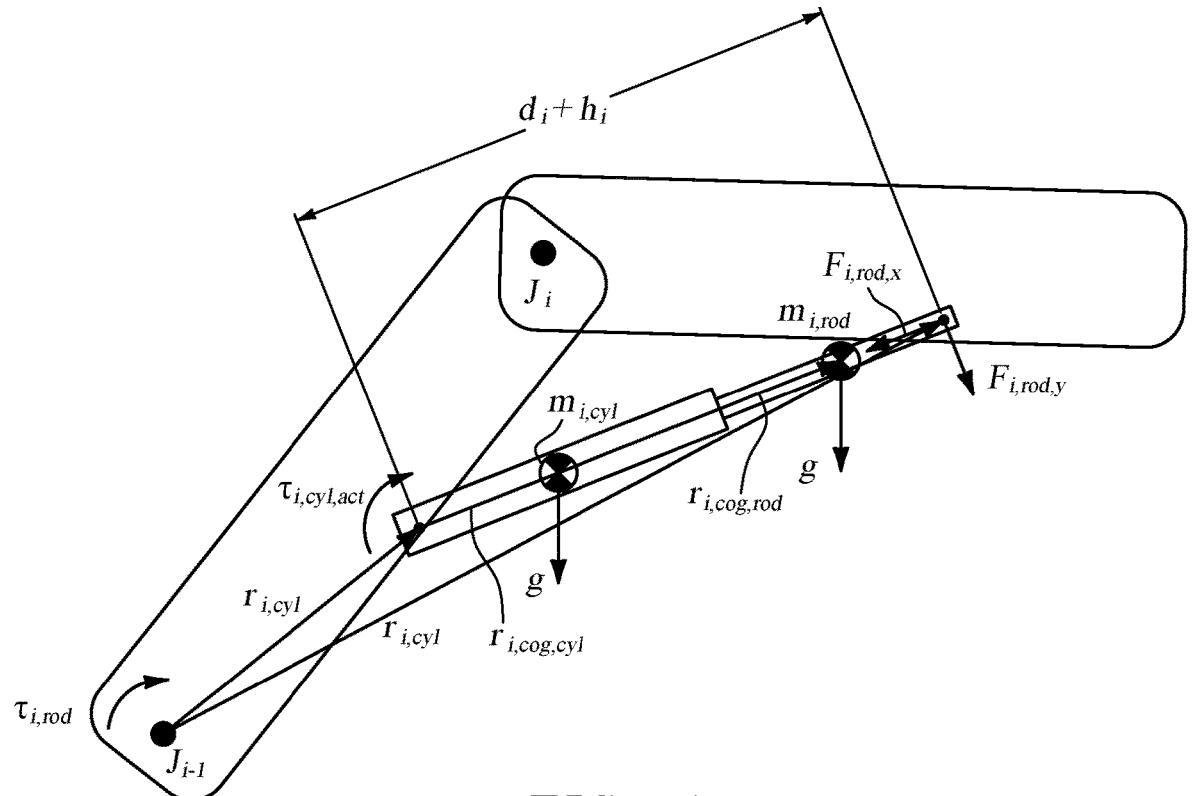
FIG. 4 is a schematic diagram of the required values for a cylinder compensation of an excavator arm.

For the compensation, the cylinders have been assumed to be mass points, with only the gravitational acceleration g acting on the mass points. The moments of inertia and the accelerations are therefore disregarded due to the movements. FIG. 4 shows two connecting elements ((i−1)th and i-th component of the manipulator), which are connected by a rotating link and a hydraulic cylinder, as is the case for the excavator. Furthermore, all the values are marked that are required for the compensation. It should be noted that the bearing forces are only depicted on the rod side and bearing forces equally act on the cylinder side.

The torque $\tau_{i,rod}$ arises due to the bearing forces $F_{i,rod,x}$, $F_{i,rod,y}$, $F_{i,cyl,x}$ and $F_{i,cyl,y}$ of the cylinder. The forces are parallel and orthogonal to the hydraulic cylinder. The forces $F_{i,rod,x}$ and $F_{i,cyl,x}$ only contain the masses of their respective components ($m_{i,rod}$ or $m_{i,cyl}$), i.e. $F_{i,rod,x}$ and $F_{i,cyl,x}$ are respectively calculated with $m_{i,rod}$ and $m_{i,cyl}$. The calculation of the bearing forces is described in the following for the rod side:

$$\tau_{i,cyl,act} = -m_{i,cyl}(r_{i,cyl} \times g) - m_{i,rod}(r_{i,rod} \times g) \quad (33)$$

$$F_{i,rod,y} = \frac{[\tau_{i,cyl,act}]_z}{d_i + h_i}$$

$$F_{i,rod,x} = [-m_{i,rod}g]_x$$

$$\tau_{i,rod} = \left[ r_{i,cyl} \times \begin{bmatrix} F_{i,rod,x} \\ F_{i,rod,y} \\ 0 \end{bmatrix} \right]_z$$

The torque $\tau_{i,cyl,act}$ acts on the link on the base side of the hydraulic cylinder, $r_{i,cyl}$ and $r_{i,rod}$ are the position vectors to the links of the hydraulic cylinder for the base side and rod side, and [•]x and [•]z each constitute an operator that selects the x and z component of the vector, respectively. The parameters $d_i$ and $h_i$ describe the lift and the installation length in the retracted state of the hydraulic cylinder. For the calculation of the bearing forces on the base side, the mass and the position vectors from equation 33 are to be added.

This calculation rule must be carried out iteratively for all the links of the hydraulic cylinder which are downstream of the link $J_{i-1}$. It must be ensured that all the parameters are provided in the same coordinate system or are appropriately transformed during the calculation. It is thus useful to first calculate the bearing forces in the coordinate system of the cylinder in question, and then to transform said forces into the coordinate system of the links. The bearing forces of previous components are not incorporated into the compensation, for example the bearing forces $F_{i,cyl,x}$ and $F_{i,cyl,y}$ do not have an impact on the measured torque of $J_i$.

Figure 5:
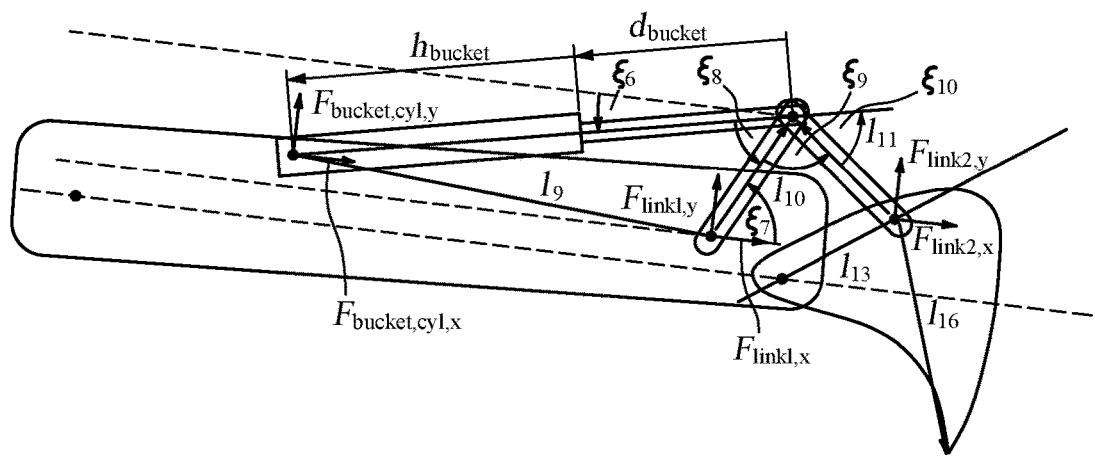
FIG. 5 is a diagram for cylinder compensation in a coupling link.

A special feature in the calculation of the bearing forces is the coupling link; see FIG. 5. The bearing forces required for the cylinder compensation are marked in green and are provided in the coordinate system of the stick. The angles $\xi_i$, where i=6, 7, 8, 9, 10, are auxiliary angles in order to calculate the distribution of the forces. The angles build upon the definitions from the work package 1. To give an overview, the position vectors and centres of mass with gravitational acceleration have been omitted.

The calculation of the cylinder bearing forces takes place according to rule 33 for the base side and rod side. The forces on the base side act directly on the rod, which is why no further calculation is necessary and a transformation into the coordinate system of the stick is sufficient. For the rod side, the forces must be distributed over the stick and the bucket via the coupling link. By means of the equilibrium of forces, the forces $F_{link1,x}$, $F_{link1,y}$, $F_{link1,y}$, $F_{link2,x}$ and $F_{link2,y}$ can lastly be established, with the assumption that the components do not undergo any acceleration also being applicable. The auxiliary angles are calculated on the basis of equation 34.

$$\xi_7 = \gamma_3 + \gamma_2 - \epsilon_2 \quad (34)$$

$$\xi_8 = \arccos\left( \frac{(h_{bucket} + d_{bucket})^2 + l_{10}^2 - l_9^2}{2(h_{bucket} + d_{bucket})l_{10}} \right)$$

$$\xi_6 = \xi_7 - \xi_8$$

$$\xi_9 = \arccos\left( \frac{l_{10}^2 + l_{11}^2 - l_{15}^2}{2l_{11}l_{10}} \right)$$

$$\xi_{10} = \pi - \xi_9 - \xi_7$$

Lastly, the unknown bearing forces $F_{link1,x}$, $F_{link1,y}$, $F_{link2,x}$ and $F_{link2,y}$ can be determined by equation 35.

$$F_{link1,x} = -(g_y m_{link1} \cos(\xi_7)\cos(\xi_{10}) - 2F_{i,rod,x}\cos(\xi_7)\sin(\xi_{10}) - 2F_{i,rod,y}\cos(\xi_7)\cos(\xi_{10}) \quad (35)$$
$$+ g_y m_{link2} \cos(\xi_7)\cos(\xi_{10}) + 2g_x m_{link1}\cos(\xi_7)\sin(\xi_{10}) + g_x m_{link1}\cos(\xi_{10})\sin(\xi_7)$$
$$+ g_x m_{link2}\cos(\xi_7)\sin(\xi_{10})) \cdot \frac{1}{2(\cos(\xi_7)\sin(\xi_{10}) + \cos(\xi_{10})\sin(\xi_7))}$$

$$F_{link1,y} = -(g_x m_{link1} \sin(\xi_7)\sin(\xi_{10}) - 2F_{i,rod,x}\sin(\xi_7)\sin(\xi_{10}) - 2F_{i,rod,y}\cos(\xi_{10})\sin(\xi_7)$$
$$+ g_x m_{link2}\sin(\xi_7)\sin(\xi_{10}) + g_y m_{link1}\cos(\xi_7)\sin(\xi_{10}) + 2g_y m_{link1}\cos(\xi_{10})\sin(\xi_7)$$
$$+ g_y m_{link2}\cos(\xi_{10})\sin(\xi_7)) \cdot \frac{1}{2(\cos(\xi_7)\sin(\xi_{10}) + \cos(\xi_{10})\sin(\xi_7))}$$

-continued $$F_{link2,x} = -(2F_{i,rod,y} \cos(\xi_7) \cos(\xi_{10}) - 2F_{i,rod,x} \cos(\xi_{10}) \sin(\xi_7) - g_y m_{link1} \cos(\xi_7) \cos(\xi_{10})$$
$$- g_y m_{link2} \cos(\xi_7) \cos(\xi_{10}) + g_x m_{link1} \cos(\xi_{10}) \sin(\xi_7) + g_x m_{link2} \cos(\xi_7) \sin(\xi_{10})$$
$$+ 2g_x m_{link2} \cos(\xi_{10}) \sin(\xi_7)) \cdot \frac{1}{2(\cos(\xi_7) \sin(\xi_{10}) + \cos(\xi_{10}) \sin(\xi_7))}$$

$$F_{link2,y} = -(2F_{i,rod,x} \sin(\xi_7) \sin(\xi_{10}) - 2F_{i,rod,y} \cos(\xi_7)) \sin(\xi_{10}) - g_x m_{link1} \sin(\xi_7)) \sin(\xi_{10})$$
$$- g_x m_{link2} \sin(\xi_7)) \sin(\xi_{10}) + g_y m_{link1} \cos(\xi_7)) \sin(\xi_{10}) + 2g_y m_{link2} \cos(\xi_7)) \sin(\xi_{10})$$
$$+ g_y m_{link2} \cos(\xi_{10}) \sin(\xi_7)) \cdot \frac{1}{2(\cos(\xi_7) \sin(\xi_{10}) + \cos(\xi_{10}) \sin(\xi_7))}$$

The variables $g_x$ and $g_y$ represent the x and y component, respectively, of the gravitational acceleration in the coordinate system of the stick, $m_{link1}$ and $m_{link2}$ are masses of the coupling link, with $m_{link1}$ being the mass of the connector between the cylinder and stick and $m_{link2}$ being the mass between the cylinder and the bucket. If the bearing forces are calculated, the torque can be calculated on the basis of the hydraulic cylinder via the position vectors and the measured torque can be corrected.

The invention claimed is:

1. System for determining mass of a payload moved by a working device of a machine, comprising:
   a lifting-gear element that is movable along a path and is designed to move the working device;
   a sensor system that is designed to provide a plurality of machine-status signals which indicate a status of the machine;
   a force sensor system that is designed to provide a lifting-force signal that indicates a force on the lifting-gear element; and
   a control device configured:
      to use system parameters for load determination that are automatically initiated by using CAD data at a factory, and/or from continuous calibration of system parameters, and/or executing a system identification procedure and determining the mass of the payload at least in part on system parameters originating from CAD data pre-configured at the factory;
      to carry out calibration using the pre-configured parameters as initialisation if unsatisfactory results are achieved, wherein the calibration is carried out when the performance of the load estimation drops;
      to carry out the calibration in an unloaded state when the working device is empty, with automatically predefined stimulation trajectories being used for the machine or instructions being provided to the operator for stimulating the parameters;
      to log the system statuses using the sensors and to carry out a system identification of this information; and
      to determine the mass of the payload on the basis of identified and/or pre-configured system parameters and system statuses including at least one of a position, a speed, an acceleration of the lifting-gear element and/or a force or torque on the lifting-gear element.

2. System according to claim 1, wherein the control device is further designed to receive the machine-status signals from the working device while the working device is being moved on a multi-dimensional, preferably three-dimensional track.

3. System according to claim 1, wherein the control device is further designed
   to recalibrate the system parameters using the CAD data as initialisation, and/or
   to automatically identify the parameters of the system by using predefined trajectories of the working device, and/or
   to identify the parameters of the system by instructions being provided to the operator for how the working device is to be moved, in order to stimulate the parameters to be identified.

4. System according to claim 1, wherein the system further comprises an actuator operatively connected to the lifting-gear element, and is preferably provided with a pivot element and a working-device system which comprises the lifting-gear element and comprises a boom element, a stick element, and the working device.

5. System according to claim 4, wherein the machine-status signals include an angular position, an angular speed and/or an angular acceleration of the pivot element, the boom element, the stick element and/or the working device, the machine-status signals preferably including at least one yaw and one roll of the machine.

6. System according to claim 4, wherein the parameters of the machine system are based at least in part on an inertia and/or a mass of the boom, the stick and the working device.

7. System according to claim 4, wherein the system parameters are based at least in part on a position of a centre of gravity of the boom element, the stick element and the working device, the position being arranged in a coordinate system which has its origin in a respectively associated rotating link, and an x axis of the coordinate system being aligned with the rotating links of a current and a following element, a z axis of the coordinate system coinciding with the rotational axis of the rotating link of a current element, and a y axis of the coordinate system being selected such that a right-angled coordinate system, preferably a right-handed coordinate system, results.

8. A method implemented in a control device, for determining mass of a payload moved by a working device of a machine, comprising the steps of:
   using predefined system parameters for load determination which are automatically identified by using CAD data of the working machine, and/or executing a system identification procedure for determining the mass of the payload at least in part based on pre-configured system parameters for determining the payload, the system parameters being based on CAD data of the working machine;
   determining the torque on the lifting-gear element and working-device statuses for identifying the system parameters for the unloaded machine while the working device is being moved;
   carrying out the system identification recursively or using an identification method for the unloaded machine;
   receiving a second set of loaded machine-status signals when the working device is being moved in the loaded state;

determining a machine status with a loaded working device on the basis of the second set of loaded machine-status signals;

determining the torques on the working device using the force on the lifting-gear element;

calculating the theoretical torque on the working device on the basis of the system parameters for the unloaded case; and determining a mass of the payload, at least in part on the basis of the system parameters, the machine statuses with the loaded working device and a lifting force when the working device is loaded.

9. Method according to claim 8, wherein the working device is moved along a three-dimensional track while the first set of unloaded machine-status signals is being received.

10. Method according to claim 8, wherein the possible initialisation of the system parameters using CAD data is carried out for the system identification, and/or the pre-configured parameters from CAD data are used for the system parameters.

11. Method according to claim 8, wherein a torque on a rotating link of the lifting-gear element is determined at least in part on the basis of the lifting force and the machine-system parameters are determined at least in part on the identified torque, wherein, in the method, a torque of the loaded working device is determined on the rotating link of the lifting-gear element, which torque is based at least in part on the lifting force of the loaded lifting-gear element, and the mass of the payload, which is based at least in part on the torque of the loaded working device, is determined; and/or the mass of the payload is determined at least in part on the basis of the system parameters.

12. Method according to claim 8, wherein the current movement of the working device is evaluated and the estimation of the load mass is displayed only under suitable conditions.

13. Method according to claim 8, wherein a pivot element and a working-device system comprising a boom element, a stick element and the working device are further provided, and the working-device system is positioned differently while the working device is being moved along a three-dimensional track in an unloaded state, the working device repeating the movement in the unloaded state with a predetermined frequency and/or the movement of the working device being executed autonomously or it being demonstrated to the operator how they are to move the working device.

* * * * *